Patented Sept. 13, 1932

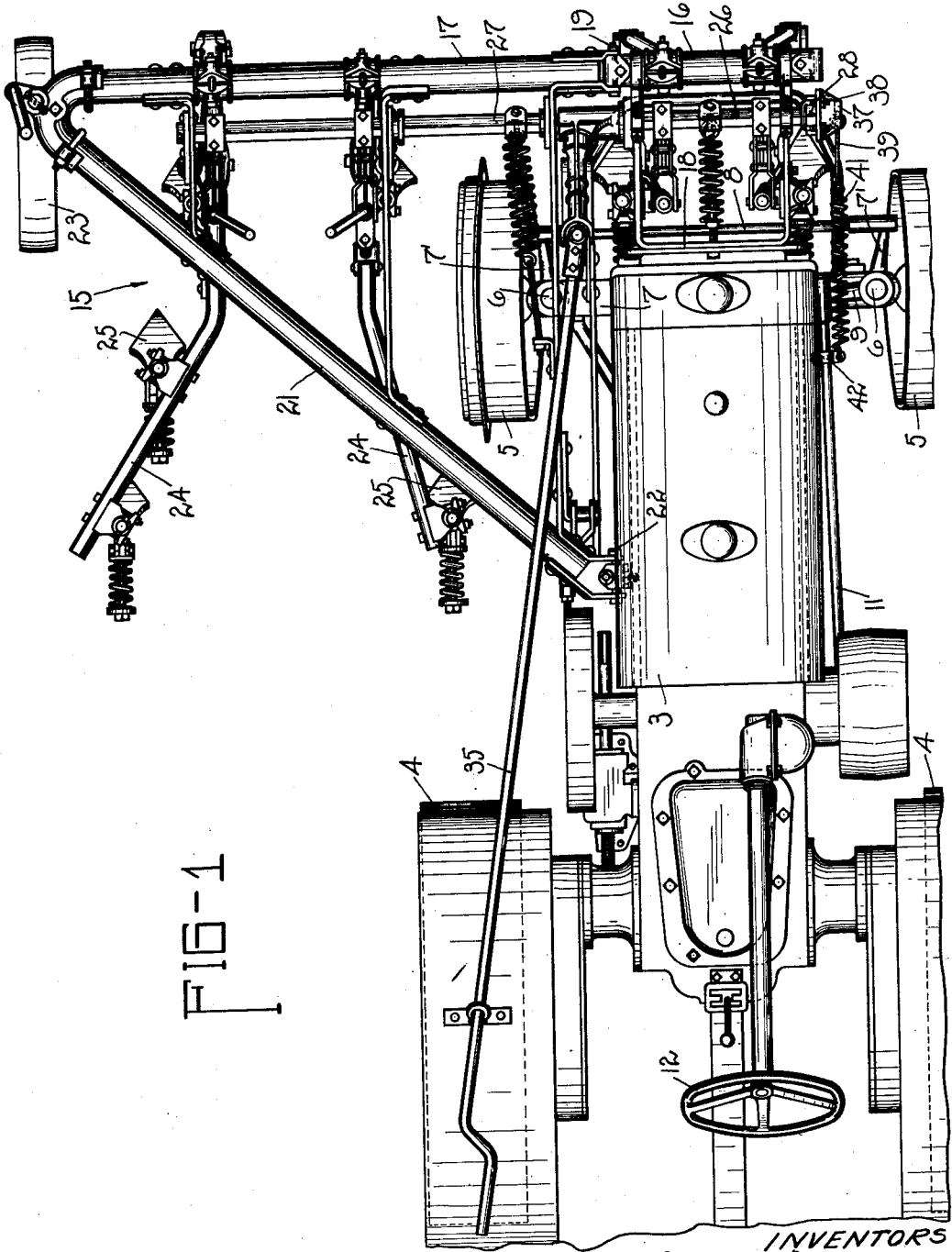

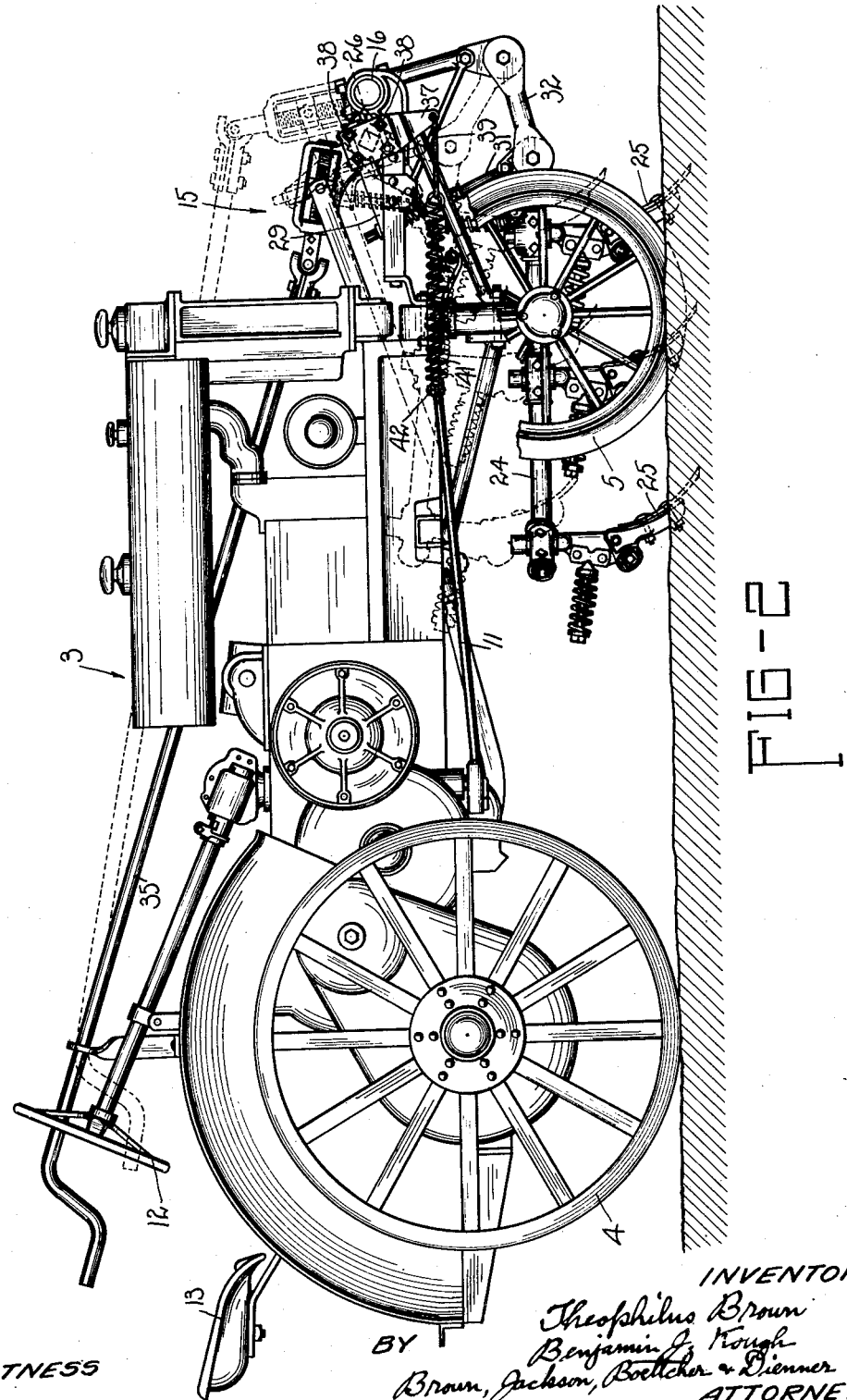

1,876,562

UNITED STATES PATENT OFFICE

THEOPHILUS BROWN AND BENJAMIN J. KOUGH, OF MOLINE, ILLINOIS, ASSIGNORS TO DEERE & COMPANY, OF MOLINE, ILLINOIS, A CORPORATION OF ILLINOIS

AGRICULTURAL IMPLEMENT

Application filed March 17, 1930. Serial No. 436,336.

The present invention relates to tractor-operated agricultural implements and is broadly concerned with means whereby load conditions of the implement influence or affect a control on the tractor.

In one of its particular embodiments the invention relates to tractor-operated agricultural implements of the soil-working type, wherein the load resistance of the implement creates a lateral pressure tending to deflect the tractor from its desired straight line of travel, and in such embodiment the primary objects of the invention are to provide improved means which will counteract this tendency so as to maintain the tractor in a straight line of travel, and to provide such a means which will be operative when the soil-working means of the implement is in engagement with the soil but which will be inoperative when said soil-working means is lifted out of engagement with the soil.

It is a more specific object of the invention to provide such means for tractor-operated cultivators wherein the load resistance of the cultivating devices is laterally unbalanced with respect to the tractor, tending to steer the latter in one direction. Such condition is sometimes established in the use of multiple row cultivators when it is desired not to use all of the sections of the cultivator. For example, in the case of a three-row cultivator, it may be desirable because of soil conditions, bad spacing of the rows, etc., to use the implement only as a two-row machine either by removing one of the laterally extending sections, or possibly by holding the cultivating devices of such section constantly out of engagement with the soil. When operating under these conditions it will be obvious that the center of load resistance is at one side with respect to the tractor, tending to turn the tractor to that side. To counteract this tendency the steering wheels of the tractor must be turned slightly in the opposite direction. The conventional tractor steering mechanism, being of the semi-locking type, will not of itself retain the steering wheels in this slightly angled relation, but the driver must hold them in that position through his manually operated steering wheel, and this becomes exceedingly tiresome in a long cultivating operation. As above remarked, the present invention avoids this objection by providing means which automatically retains the steering wheels at the desired offset angle to counteract the laterally unbalanced load condition.

Also, as above remarked, this improved means is preferably arranged so that it is only effective when the soil-working devices are in engagement with the soil, and is released for removing the steering bias from the tractor when the soil-working devices are lifted to inoperative positions.

While the utility of the invention resides principally in the use above described, we wish to point out that the invention is also capable of other uses, such as for varying the setting of the throttle or spark of the tractor engine with variations of the load.

Referring now to the accompanying drawings wherein we have illustrated a preferred embodiment of our invention:

Figure 1 is a plan view of a tractor operated three-row cultivator, with the right-hand section removed for converting it to a two-row machine, and Figure 2 is a side elevational view of the same with parts broken away, and illustrating the relation of the present steering compensating means.

The tractor 3 may be of any conventional type comprising traction wheels 4 and steering wheels 5, with the latter disposed at the front end of the tractor, although this is not essential.

Moreover, these front steering wheels are shown as being mounted for turning on separate steering spindles 6 at the outer ends of the front axle 7, but it will be understood that the invention is also applicable to that type of tractor wherein these wheels are in close proximity to each other for turning about a single centrally disposed steering axis, or wherein only one steering wheel is employed. In the type of tractor illustrated, the conventional automobile steering arrangement is employed, comprising arms 7' extending from both steering spindles 6 and crossconnected by the link 8, and comprising another arm 9 extending from one of these spindles and operatively connected with a drag link 11. Such drag link has the conventional geared connection with the manually operated steering wheel 12 disposed adjacent to the driver's seat 13.

The implement structure 15 is shown in the form of a three-row cultivator attachment disposed at the front of the tractor and partly supported thereon, but it will be understood that the invention is not necessarily limited to this specific type and arrangement of implement. In these implements the frame structure generally comprises an intermediate and two-laterally extending sections, represented by the intermediate transverse bar 16 and the laterally extending bar 17. The intermediate bar 16 is connected with the tractor through a rearwardly extending frame structure 18.

Each laterally extending bar 17 is pivotally connected with the end of the intermediate bar 16 by a horizontally extending pivotal connection 19 which permits the outer end of the extension bar 17 to rise and fall relatively to the tractor, and projecting inwardly and rearwardly from the outer end of the lateral bar 17 is a brace portion 21 which is pivotally connected to the side of the tractor at 22. A caster wheel 23 is usually provided to support the outer end of each outrigger extension 17. The rig beams are indicated at 24, the rigs which cultivate the intermediate row being connected with the intermediate bar section 16 and the rigs which cultivate the laterally disposed rows being connected with the outrigger bar sections 17. The cultivating shovels 25 are representative of any desired soil-working devices carried by these beams.

All of the rigs are adapted for simultaneous raising and lowering through the actuation of a transversely extending rockshaft comprising intermediate and laterally disposed sections 26 and 27 which have bearing support respectively in bearings carried by the intermediate and laterally disposed frame sections 16 and 17. These rockshaft sections are coupled together by suitable universal joints, the square plate 28 on the right-hand end of the intermediate rockshaft section 26 being illustrative of one of the coupling members of one of these universal joints.

Secured to these rockshaft sections, over each cultivating rig, are arms 29 (Figure 2) which connect through links 31 with the pivoted forward ends of the rig beams 24, such forward ends being also pivotally connected through draft links 32 with rigid draft arms depending from the frame bars 16 and 17. The rocking of said rockshaft sections is effected by a power-lift mechanism deriving its actuating power from the motor of the tractor, and is also effected through a manually actuated adjusting member 35 for affording a master depth adjustment of the rigs. The particular construction and mode of operation of the power-lift mechanism and of the master depth-adjusting mechanism are disclosed in the copending application of Theophilus Brown and Theodore W. Johnson, Serial No. 402,065, filed October 24, 1929, to which attention is also directed for details of the implement frame construction and rig mounting. This portion of the structure is not per se a part of the present invention. It will suffice to say that when the rockshaft sections 26 and 27 are rocked in a clockwise direction (Figure 2) the rigs are raised and that when such shaft sections are rocked in the reverse direction the rigs are lowered.

A full rocking movement raises the rigs to transport position or lowers them to cultivating position.

When it is desired to cultivate only two rows, one of the outrigger sections 17 is removed. Figure 1 illustrates the righ-hand section removed, such being effected by disconnecting the frame members 17 and 21 at the pivotal connections 19 and 22. In compensating for the consequent shifting of the center of load, we secure an arm 37 to the rockshaft section 26. This arm is constructed so that it can be readily attached to the rockshaft, and to this end is formed with a relatively large plate portion at its upper end which is apertured to receive two U-bolts 38. The flat inner side of this plate portion is placed against the outer face of the universal joint coupling member 28, and the U-bolts are engaged over the corners of such coupling member and tightened to clamp the arm 37 to the coupling member. Pivotally connected to the lower end of said arm is a link 39 which is hooked at its rear end to a tension spring 41. The rear end of said tension spring is hooked to an apertured ear extending from a bracket 42 which is secured to the drag link 11. Such bracket or clip 42 is adapted to be adusted to different points along the drag link for increasing or decreasing the tension of the spring 41, and to th's end such bracket clip may be constructed of two clamping sections for clamping upon the drag link, or may be provided with a set screw for securing the same thereto.

When the rockshaft is rocked in a counterclockwise direction to swing the rig beams down to the cultivating position illustrated in full lines in Figure 2, the arm 37 is swung forwardly, thereby placing tension on the spring 41. This tension acting through the drag link 11 and steering arm 9 operate to angle the two steering wheels 5 slightly to the right to counteract the unbalanced load condition tending to steer the tractor to the left. By appropriately adusting the position of the bracket clip 42 on the drag link 11 the spring 41 can be adjuster so that when it is in its tensioned condition it will angle the steering wheels 5 to just the right amount to hold the tractor and implement on a straight course of travel. This completely relieves the driver of the burdensome duty of holding the implement on its course through holding the manually operated steering wheel 12 in the proper position, and still leaves the steering apparatus of the tractor free to be manipulated by the driver in dodging offset plants, etc. When the rockshaft is rocked in a clockwise direction to raise the rigs to the transport position illustrated in dotted lines in Figure 2, the arm 37 is swung rearwardly, thereby releasing the tension on the spring 41. This removes all steering bias from the tractor so that the steering wheels 5 will tend to run straight ahead.

It will thus be seen that by our invention we provide means which will compensate for any lateral steering deflection caused by a laterally displaced center of load, but which compensating means, however, will be automatically released when the unbalanced load resistance is removed. It should also be noted that in making a master depth adjustment through the control member 35 for causing the cultivating devices to penetrate the soil to a greater depth the consequent rocking of the rockshaft sections in a counterclockwise direction will impose added tension on the spring 41 so that the steering bias effective on the steering wheels will be more or less proportionate to the depth of cultivation which determines the degree of resistance of the offset load.

Our invention can be embodied in other constructions and arrangement of parts, and hence the invention is not to be limited to the specific disclosure above described. For example, as remarked in the fore part of the present description it is within the broad scope of our invention to have the variations in the load resistance of the implement affect other controls of the tractor in addition to or separate from the steering control. For example, the spring 41 might be connected to the throttle or spark control on the tractor to vary the torque or speed of the tractor engine with variations of the load placed on the implement.

We claim:

1. In an agricultural implement, the combination with a tractor including a steering mechanism, of cultivating devices associated with the tractor and movable into and out of ground contacting position, said devices tending, when in contact with the ground, to steer the tractor to one side, and means connected with said mechanism and responsive to movement thereof for exerting a steering bias on said steering mechanism for counteracting said steering deflection caused by said cultivating devices contacting with the ground.

2. In an agricultural implement, the combination with a tractor including a steering wheel, of cultivating devices associated with the tractor and tending, when in operative position, to steer the tractor to one side, lifting means for moving said cultivating devices into and out of operative position, and means responsive to said lifting means for exerting a steering bias on said steering wheel for counteracting the steering deflection of said cultivating devices.

3. In an agricultural implement, the combination with a tractor including a steering wheel, of a plurality of cultivating rigs associated with the tractor and tending, when in operative position, to steer the tractor to one side, a rockshaft for raising and lowering said rigs, and means responsive to said rockshaft for exerting a steering bias on said steering wheel for counteracting the steering deflection of said cultivating rigs.

4. In an agricultural implement, the combination with a tractor including steering mechanism, of a plurality of cultivating rigs associated with the tractor and tending, when in operative position, to steer the tractor to one side, a rockshaft for lifting and lowering said cultivating rigs, and means connected between said rockshaft and said steering mechanism for exerting a steering bias on said mechanism to counteract the steering deflection of said cultivating rigs.

5. In an agricultural implement, the combination with a tractor including a steering wheel and steering mechanism connected therewith, of an attachment comprising a frame connected with the front portion of the tractor and extending laterally therefrom, a plurality of cultivator rigs movably connected with said frame, said rigs, when in cultivating position, establishing a center of load resistance to one side of the longitudinal center line of the tractor and therefore tending to steer the tractor to such side, a rockshaft carried by said frame, means operatively connecting said rockshaft with said rigs for raising and lowering the same, an arm extending from said rockshaft, and a spring connected between said arm and said steering mechanism whereby when said rigs are in cultivating position said spring is stressed to exert a steering bias on the tractor steering wheel for counteracting the steering deflection of the cultivating rigs.

6. In an agricultural implement, the combination with a tractor including steering mechanism, of soil-working devices associated with the tractor, lifting means for raising said devices out of operative position, said soil-working devices, when in operative position, tending to steer the tractor to one side, and means rendered effective when said lifting means is actuated for lowering said soil working devices to operative position for exerting a steering bias on said steering mechanism for counteracting the steering deflection of said soil-working devices, said latter means being rendered non-effective when said lifting means is actuated for raising said soil-working devices to inoperative position.

7. In an agricultural implement, the combination with a tractor including a steering wheel, of a soil-engaging device associated with the tractor and tending, when in operative position, to deflect the travel of the tractor, and means responsive to the vertical position of said soil-engaging device relative to the ground for exerting a steering bias on said steering wheel to counteract the deflection of said soil-engaging device.

8. In an agricultural implement, the combination with a tractor including a steering wheel, of a soil-engaging device associated with the tractor, means for lowering and raising said device into and out of operative position relative to the ground, said device creating an offset load condition on the tractor when the device is in operation, thereby tending to steer the tractor to one side, and means for exerting a steering bias on said steering wheel for counteracting said deflection of said soil-engaging device, said last named means being actuated upon lowering of the device into operative position.

9. In an agricultural implement, the combination with a tractor including a steering wheel, of a soil-engaging device associated with the tractor and creating an unbalanced load condition tending to steer the tractor to one side, means for lifting said soil-engaging device to inoperative position, and means responsive to said lifting means for holding said steering wheel angled in the opposite direction to counteract the steering deflection of said soil-engaging device.

10. In an agricultural implement, the combination with a tractor including a steering wheel, of a soil-engaging device associated with the tractor and tending to steer the latter to one side, and means for holding said steering wheel angled in the opposite direction for counteracting the steering deflection of said soil-engaging device, said device being movable into and out of engagement with the soil, and said means being positively actuated upon movement of the device into engagement with the soil.

11. In an agricultural implement, the combination with a tractor including a steering wheel, of cultivating devices associated with the tractor and tending, when in operative position, to steer the tractor to one side, adjusting means for adjusting the depth of cultivation of said devices, and means for exerting a steering bias on said steering wheel to counteract the steering deflection of said cultivating devices, said latter means increasing or decreasing such steering bias with increased or decreased depth adjustments of said cultivating devices.

12. In an agricultural implement, the combination with a tractor including a steering wheel, of a soil-engaging device associated with the tractor and tending to steer the tractor to one side, adjusting means for adjusting the depth of penetration of said device in the soil, and means for angling said steering wheel in the opposite direction to counteract the steering deflection of said soil-engaging device, said latter means responding to said depth-adjusting means for increasing or decreasing the counteracting steering angle of said wheel with increased or decreased depth adjustments of said soil-engaging device.

13. In an agricultural implement, the combination with a tractor including a steering wheel, of cultivating devices associated with the tractor and tending to steer the latter to one side, adjusting means for adjusting the depth of penetration of said devices in the soil, and yieldable means for exerting a steering bias on said steering wheel for counteracting the steering deflection of sail cultivating devices, said latter means increasing or decreasing such steering bias with increased or decreased depth adjustments of said cultivating devices.

14. In an agricultural implement, the combination with a tractor including a steering wheel, of culitvating devices associated with the tractor and tending, when in operative position, to steer the tractor to one side, lifting means for moving said cultivating devices into and out of operative position, and yieldable means responsive to said lifting means for exerting a steering bias on said steering wheel for counteracting the steering deflection of said cultivating devices.

15. In an agricultural implement, the combination with a tractor including a steering wheel, of cultivating devices associated with the tractor and tending to steer the latter to one side, adjusting means for adjusting the depth of penetration of said devices in the soil, yieldable means for exerting a steering bias on said steering wheel for counteracting the steering deflection of said cultivating devices, and means for adjusting said yieldable means, said yieldable means responding to said depth adjusting means for increasing or decreasing said steering bias with increased or decreased depth adjustments of said devices.

16. In an agricultural implement, the combination with a tractor including a steering wheel, of cultivating devices associated with the tractor and tending, when in operative position, to steer the tractor to one side, lifting means for moving said cultivating devices into and out of operative position, yieldable means responsive to said lifting means for exerting a steering bias on said steering wheel for counteracting the steering deflection of said cultivating devices, and means for adjusting said yieldable means.

17. The combination with a tractor having control means movable into and out of operative position, of an agricultural implement having means for applying a load thereto, and a connection between said control means and said load applying means, actuation of said load applying means exerting a force on the control means through said connection tending to shift said control means.

18. The combination with a tractor having means for controlling the tractor, of an implement having ground working tools, means for raising and lowering said tools, and a connection between said control means and said raising and lowering means whereby the actuation of said raising and lowering means causes a force to be exerted on said control means through said connection.

19. In an agricultural implement, the combination with a tractor having means for controlling the tractor, of cultivating devices associated with the tractor, means for raising and lowering said devices, and a connection between said control means and said raising and lowering means, whereby a force is exerted on the control means by the raising and lowering means upon the devices being held in lowered condition.

20. The combination with a tractor having control means, of an implement having a ground engaging member, means operative for holding said member in and out of engagement with the ground, and a resilient connection between said control means and said holding means, whereby said holding means exerts a biasing force on said control means.

21. In combination, a tractor having control means, a ground engaging member connected with the tractor, means for moving and holding said member in and out of ground engaging condition and for adjusting the member in ground engaging condition, and connecting means between said control means and said operating means responsive to said moving and holding means holding said ground engaging member in ground engaging condition and responsive to adjustments of said member in ground engaging condition for exerting a controlling force on said control means.

22. In combination, a tractor, means on the tractor for controlling the tractor, a ground engaging member connected with the tractor, operative means for moving said member into and out of ground engaging condition, and means connecting said control means and said operative means whereby operation of said operative means causes a force to be exerted on said control means through said connecting means.

23. In combination, a tractor, means on the tractor for controlling the tractor, a ground engaging member connected with the tractor, operative means for moving said member into and out of ground engaging condition and for adjusting said member in ground engaging condition, and means connecting said control means and said operative means whereby operation of said operative means causes a force to be exerted on said control means through said connecting means, said force being proportionate to the adjustments of said member in ground engaging condition.

24. In combination, a tractor, steering means on the tractor for controlling the tractor, a ground engaging member connected with the tractor, adjusting means for moving said member into and out of ground engaging condition and for adjusting said member in ground engaging condition, and spring means biased between said control means and said adjusting means to exert a force on said control means proportionate to the adjustments of said member in ground engaging position.

25. In combination, a tractor, steering means on the tractor for controlling the tractor, a ground engaging member connected with the tractor, adjusting means for moving said member into and out of ground engaging condition and for adjusting said member in ground engaging condition, and spring means biased between said control means and said adjusting means to exert a force on said control means dependent upon the position of said member.

In witness whereof, we hereunto subscribe our names this 13th day of March, 1930.

THEOPHILUS BROWN.
BENJAMIN J. KOUGH.

CERTIFICATE OF CORRECTION.

Patent No. 1,876,562. September 13, 1932.

THEOPHILUS BROWN ET AL.

It is hereby certified that error appears in the printed specification of the above numbered patent requiring correction as follows: Page 5, lines 5 and 6, strike out the words "movable into and out of operative position" and insert the same to follow the word "means" in line 7, of same claim; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.